(No Model.)
J. W. TURNER & E. W. STRACK.
BAND CUTTER AND FEEDER FOR THRASHING MACHINES.
No. 319,940. Patented June 9, 1885.
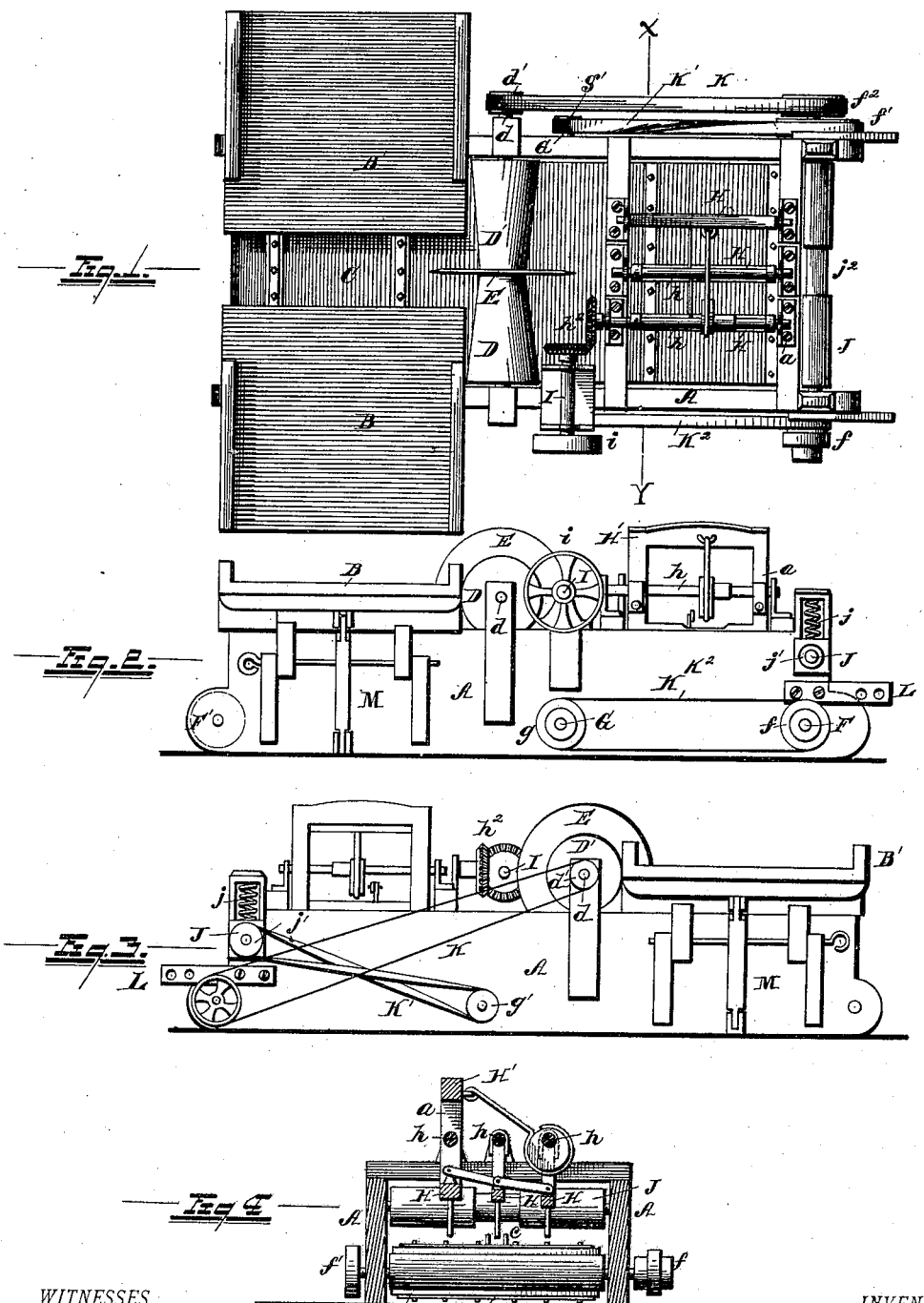

UNITED STATES PATENT OFFICE.

JACOB W. TURNER AND EDWARD W. STRACK, OF MIDDLE POINT, OHIO.

BAND-CUTTER AND FEEDER FOR THRASHING-MACHINES.

SPECIFICATION forming part of Letters Patent No. 319,940, dated June 9, 1885.

Application filed January 19, 1885. (No model.)

*To all whom it may concern:*

Be it known that we, JACOB W. TURNER and EDWARD W. STRACK, of Middle Point, county of Van Wert, State of Ohio, have invented a new and useful Improvement in Band-Cutter and Feeder for Thrashing-Machines; and we do hereby declare the following to be a full, clear, and exact description of the same, such as will enable others skilled in the art to which it pertains to make and use it, reference being had to the accompanying drawings, which form a part of this specification.

Our invention consists of the combinations of devices and appliances hereinafter specified, and more particularly pointed out in the claims.

In the drawings, Figure 1 is a plan view of a device embodying our invention. Fig. 2 is a side elevation. Fig. 3 is an elevation of the opposite side. Fig. 4 is a vertical section along the line $x\,y$.

The object of our invention is to provide a novel band-cutter and feeder for thrashing-machines.

We carry out our invention as follows:

A is any suitable frame. B and B' represent tables located upon either side thereof in any suitable manner.

C is a revolving belt with cleats attached.

D and D' represent two tapering rolls. E is a rotatable knife located between them, said knife preferably having a sickle-edge. These rolls and the knife are located upon a shaft, $d$, provided with a pulley, $d'$, whereby they may be rotated.

F and F' represent drums located at either end of the frame, over which the rake is carried. The drum F is provided with pulleys $f\,f'\,f^2$.

G is a shaft intermediate of the ends of the frame provided with pulleys $g\,g'$.

H represents one or more spreading-rakes, located at the end of the frame adjacent to the cylinder. These rakes are supported upon shafts $h$, provided with suitable bearings, $a$. It will be observed that these rakes are so hung as to have a swinging motion from side to side to spread the grain after the band is cut. This swinging motion is accomplished in any suitable manner—as, for instance, one of the rakes may have its frame extended, as shown at H', and connected eccentrically with one of the shafts $h$, said shaft being geared with the shaft I, as shown at $h^2$, the shaft I provided with a pulley, $i$.

J is a roller adjacent to the cylinder held down by springs $j$, and provided at one end with a pulley, $j'$.

The pulleys above described are connected by suitable belts, K K' K², &c. The cleats are preferably provided with suitable teeth, $c$, to assist in carrying the sheaf under the knife and to prevent the straw from lodging. The roller J is suitably cut away, as shown at $j^2$, to permit the passage of the teeth without obstruction.

The device may be connected to the thrasher in any suitable manner—as, for instance, by means of attaching-arms L—and may be supported at its free end by suitable legs, M.

Power may be applied to the cutting and feeding device in any suitable manner—as, for instance, by a belt from the cylinder-shaft to one of the cone-pulleys, so that when the grain is dry it can be run on a fast feed, and if damp upon a slow feed.

The operation of the device is as follows: The sheaf is thrown upon the tables and rolls down upon the rake C and is carried under the revolving knife, in consequence of which the band is cut. The rake carries it thence under the spreading-rakes, where the grain is spread laterally over the revolving rake, the grain then being carried under the roller J, which roller tends to prevent the cylinder from snatching the grain from the feeder too fast, the tables being set at an angle, insuring the sheaf being carried to the center of the revolving rake, and so without fail under the knife.

This device may be made light and without great expense, and in practice has been found to operate in a satisfactory manner.

We would have it understood that we do not confine ourselves to any precise arrangement of pulleys and belts for operating the cutter and the revolving and spreading rakes, as their operation may be effected by any suitable arrangement of belts and gear.

Instead of constructing the tapered rolls D D' separately, it is evident that they may be constructed integrally, and the knife be located at the juncture of the tapers upon either end.

What we claim is—

1. The combination, with a frame, of a rotatable carrying-belt, rolls tapering from their outer ends toward the middle and provided with a cutter intermediate of their ends, and tables arranged to throw the sheaf upon the middle of the belt so that the band will be in range of the cutter, substantially as described.

2. The combination, with a frame provided with a carrying-belt, of rolls tapering from their outer ends toward the middle and a rotatable cutter located intermediate of the outer ends of said rolls, substantially as described.

3. The combination, with a frame provided with a carrying-belt, of rolls tapering from their outer ends toward the middle and provided with a rotatable cutter intermediate of their outer ends, a spreading-rake located in the rear of the cutter, and tables arranged to throw the sheaf upon the middle of the carrying-belt so that its band will be in range of the cutter, substantially as described.

In testimony whereof we sign this specification in the presence of two witnesses.

JACOB W. TURNER.
EDWARD W. STRACK.

Witnesses:
GEO. E. WELLS,
WM. N. LONGSWORTH.